Feb. 22, 1966  D. L. RAYMOND  3,236,453
INTERNAL-COMBUSTION BOOSTER HEATER FOR VEHICLE HEATING SYSTEM
Filed May 24, 1963  4 Sheets-Sheet 1
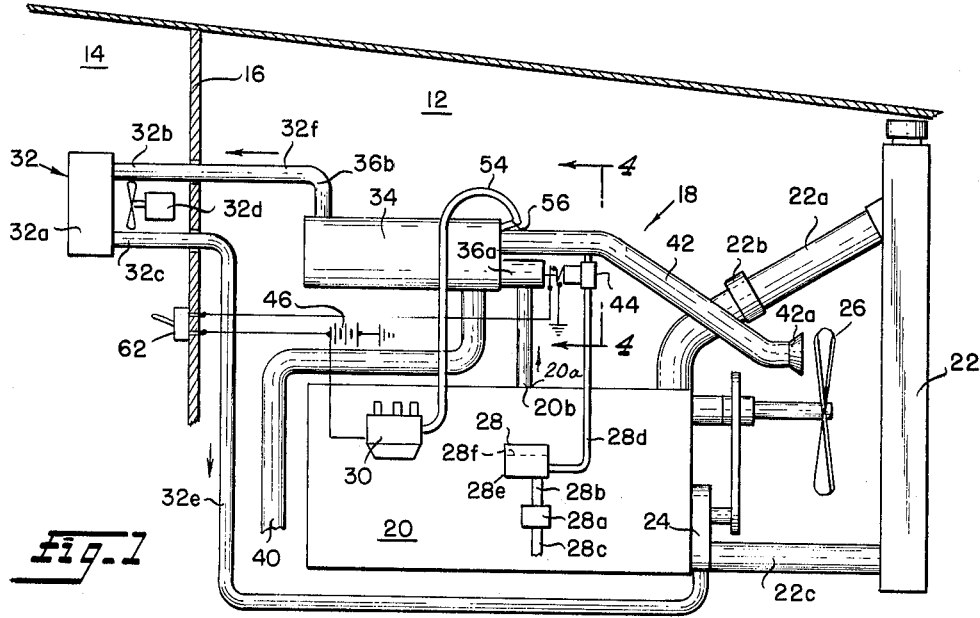
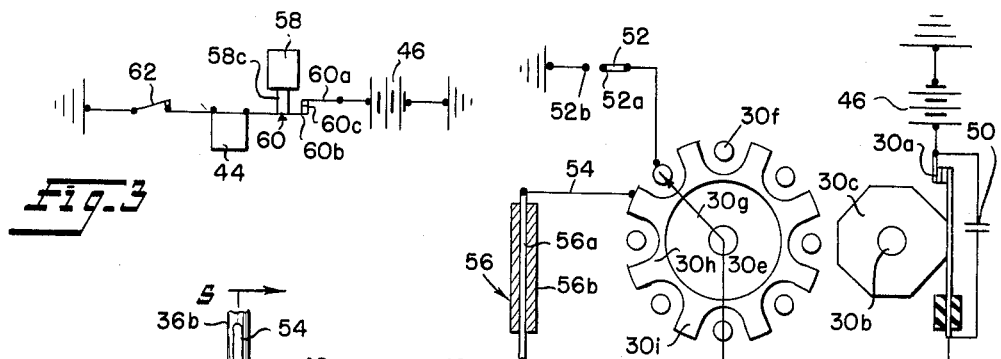
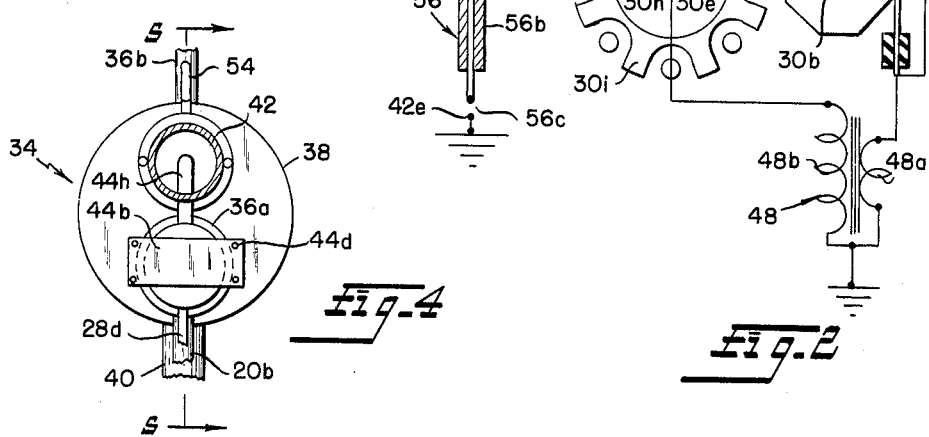
INVENTOR.
David L. Raymond
BY
Attorneys

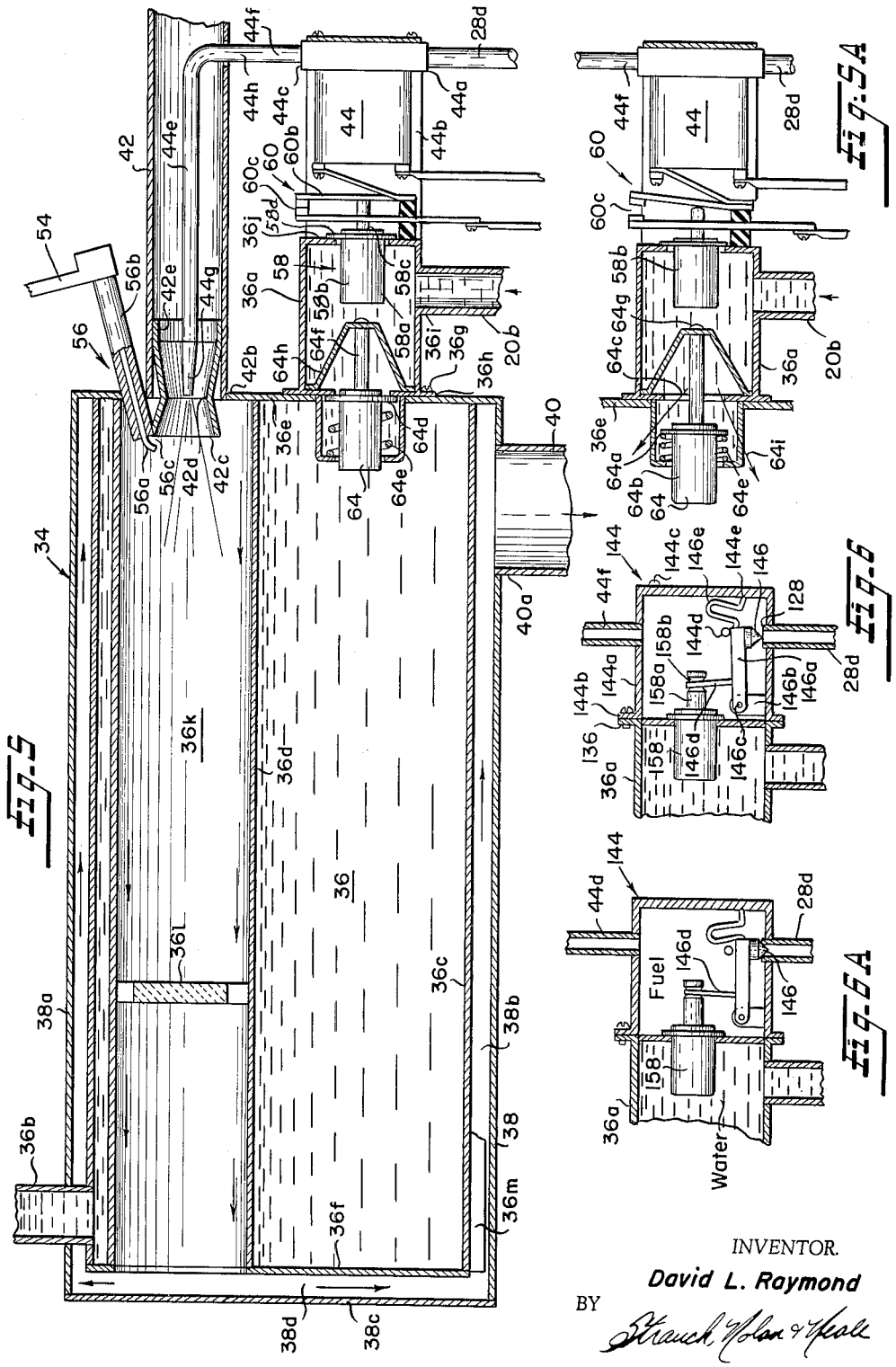

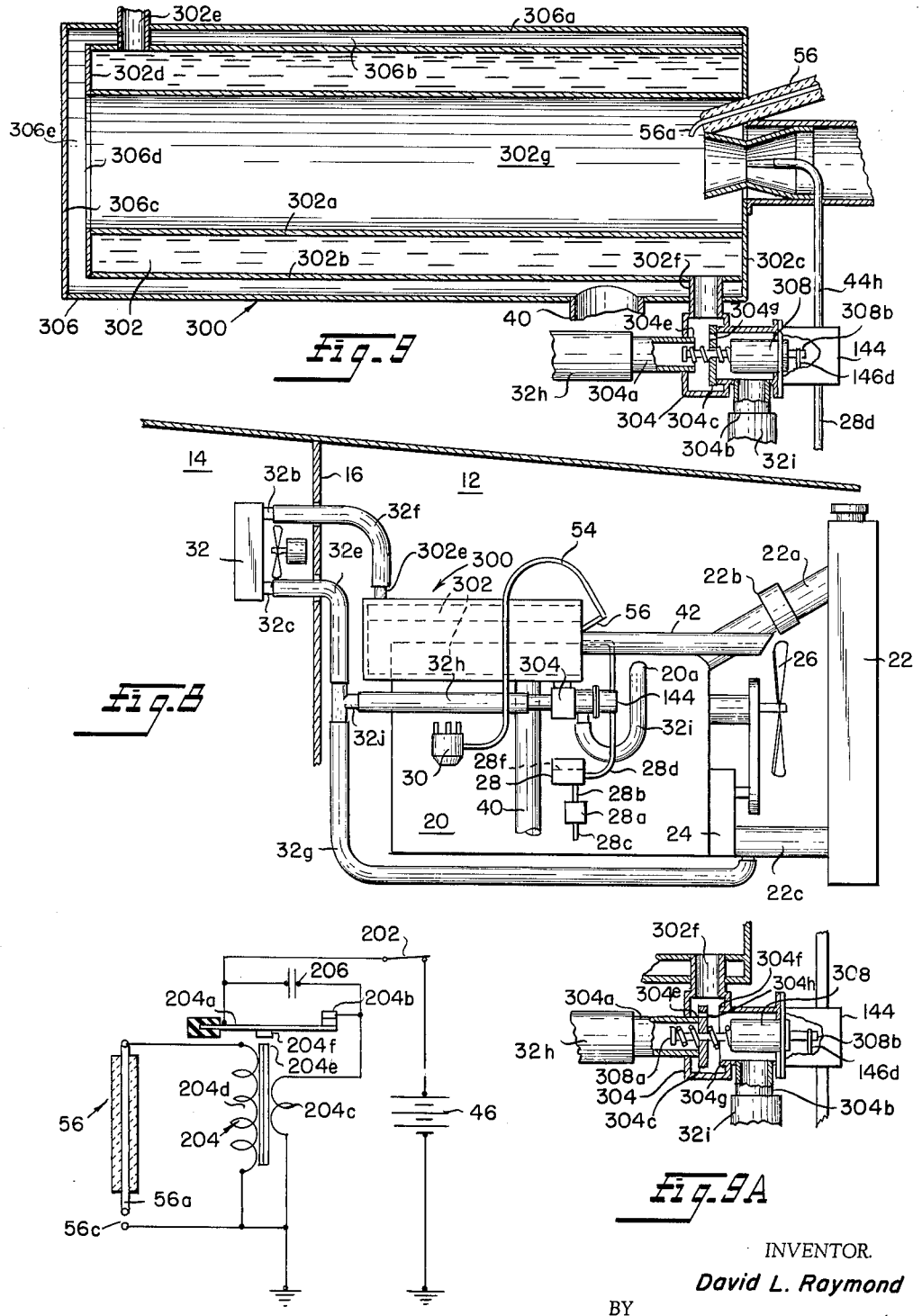

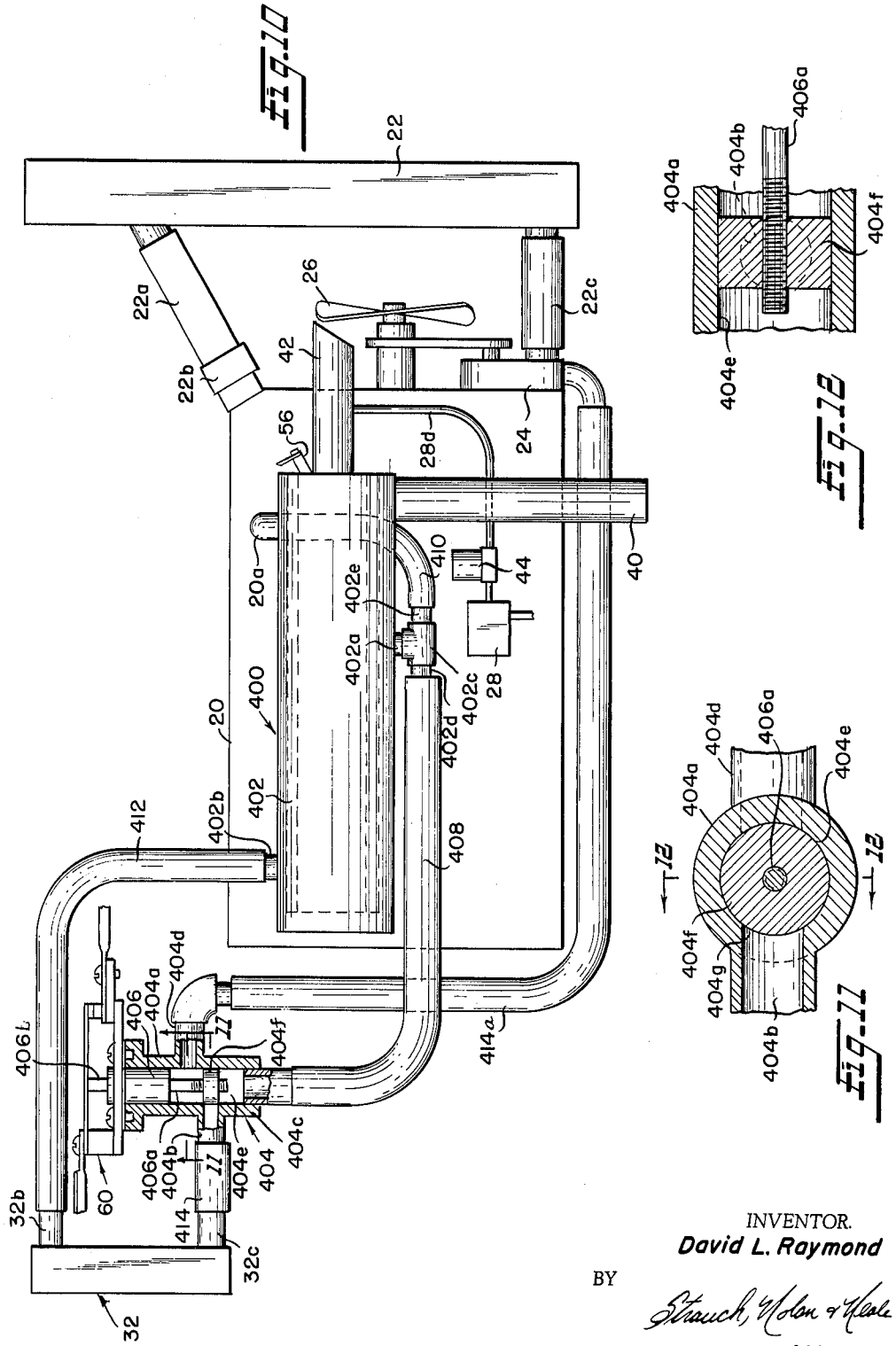

United States Patent Office 3,236,453
Patented Feb. 22, 1966

3,236,453
INTERNAL-COMBUSTION BOOSTER HEATER FOR VEHICLE HEATING SYSTEM
David L. Raymond, Cleveland, Ohio, assignor to Hupp Corporation, Cleveland, Ohio, a corporation of Virginia
Filed May 24, 1963, Ser. No. 282,906
10 Claims. (Cl. 237—8)

This invention relates to heating systems for motor vehicles and, more specifically, to novel motor vehicle heating systems provided with booster heaters to supplement waste engine heat.

It is customary to heat the passenger compartments of automobiles by blowing air over a heat exchanger through which water or other coolant heated by the engine is circulated. In cold weather, however, as long as ten minutes may elapse from the moment the engine is started until the coolant is hot enough to provide a comfortable temperature within the automobile. In addition, extended operation at low temperature is detrimental to and may substantially shorten the life of the engine. This is of particular importance to automobile manufacturers who now commonly furnish warranties on the power plants of their automobiles for periods as long as five years.

Thus, there is a demand from the motoring public and from automobile manufacturers for motor vehicle heating systems which will quickly heat the interior of the vehicle and which will accelerate the warm-up of the engine. This demand has led to the development of booster heaters in which combustion of fuel supplies added heat to the coolant until the engine is warmed up to its normal operating temperature. The heaters provided in the past for this purpose have either had such a low heating capacity that they were relatively ineffective, or they have been so expensive to produce that they were impractical.

In addition, those booster heaters which have had adequate capacity have generally been difficult to install and to service, and have been so complicated that they often are out of order, due primarily to the multiplicity of controls and safety devices required. Typical of the complicated prior art booster heaters are those shown in United States Patents Nos. 2,508,277 to Leslie and 2,507,-113 to Marshall.

Accordingly, it is one object of the present invention to provide novel, improved vehicle heating systems including combustion type booster heaters.

Other objects of the present invention include the provision of novel vehicle heating systems in accordance with the preceding object which:

(1) will permit the vehicle passenger compartment to be warmed to a comfortable temperature substantially faster than has heretofore been possible;

(2) will permit the vehicle engine to be heated to its normal operating temperature substantially faster than has heretofore been possible;

(3) have an adequate heating capacity;

(4) are substantially more compact and less expensive to manufacture and to maintain than those of the prior art;

(5) may be safely, effectively, and efficiently operated without the necessity of employing the complicated control and safety devices required by the systems heretofore developed; and (6) operate in a completely automatic manner.

These and other objects of the present invention will become more fully apparent by reference to the appended claims and as the following detailed description proceeds in reference to the accompanying drawing, wherein:

FIGURE 1 is a schematic representation of an automobile provided with a heating system constructed in accordance with the principles of the present invention;

FIGURE 2 is a circuit diagram of an ignition system for a booster heater employed in the vehicle heating system of FIGURE 1;

FIGURE 3 is a circuit diagram of the system employed to control the supply of fuel to the booster heater of the system shown in FIGURE 1;

FIGURE 4 is an end elevation of the booster heater, looking in the direction of the arrows 4—4 of FIGURE 1;

FIGURE 5 is a longitudinal vertical section through the booster heater, taken substantially along line 5—5 of FIGURE 4, and illustrates the thermostatic control apparatus incorporated therein in one operating condition;

FIGURE 5A is a fragmentary sectional view showing the thermostatic control apparatus of FIGURE 5 in a second operating condition;

FIGURE 6 is a fragmentary sectional view of a modified form of booster heater with a different type of thermostatic control;

FIGURE 6A is a view of the thermostatic control of FIGURE 6, but in a different operating condition;

FIGURE 7 is a circuit diagram of an alternate ignition circuit for the booster heater;

FIGURE 8 is a schematic representation similar to FIGURE 1, but showing another form of the invention;

FIGURE 9 is a longitudinal vertical section of the booster heater incorporated in the form of the invention shown in FIGURE 8, illustrating the thermostatic control in one operating condition;

FIGURE 9A is a fragmentary section showing the thermostatic control of FIGURE 9 in a different operating condition;

FIGURE 10 is a side elevation, partly in section, showing still another form of the invention;

FIGURE 11 is an enlarged scale section through a portion of the embodiment of FIGURE 10, taken substantially along line 11—11 of that figure; and FIGURE 12 is a section of the embodiment of FIGURE 10, taken substantially along line 12—12 of FIGURE 11.

First embodiment

Referring now to the drawing, FIGURE 1 illustrates an automobile having an engine compartment 12 and a passenger compartment 14 separated by a fire wall 16. An engine 18 including a liquid-cooled cylinder block 20 (incorporating a coolant jacket 20a) is located in compartment 12 together with cooling radiator 22, coolant pump 24, upper radiator hose 22a, upper radiator hose thermostat 22b, lower radiator hose 22c, cooling fan 26, carburetor 28, fuel pump 28a (which is connected to carburetor 28 by tube 28b and to the fuel supply tank (not shown) by tube 28c), and a distributor 30 for supplying timed ignition sparks to the engine's spark plugs. Except as explained in the following description, these are all standard components of a conventional liquid-cooled spark-ignition automobile engine.

Within passenger compartment 14 at any desired elevation is the usual heat exchanger 32 employed to provide heat for the passengers. It has a liquid to air heat exchanger core 32a through which engine coolant is circulated, and a fan 32d which blows air across core 32a where it is warmed by hot water or other coolant heated by rejected engine heat and circulated from the coolant jacket 20a in engine block 20 through the heat exchanger core. Heat exchanger 32 may be provided with an adjustable thermostatic valve (not shown) to control the flow of coolant through core 32a and thereby regulate its heat output.

Outlet 32c of heat exchanger core 32a is connected to the inlet of coolant pump 24 by a hose 32e. Inlet 32b is connected by conduit 32f to a booster heater 34 located adjacent engine block 20. While shown above the top of block 20, it may be placed at one side of the block if desired.

As shown in FIGURES 4 and 5, booster heater 34 has a liquid chamber 36 filled with water or other engine coolant, an inlet tube 36a, and an outlet tube 36b. Inlet tube 36a communicates with the lower portion of chamber 36 and is connected to the coolant jacket 20a in block 20 by conduit 20b which may be pipe, tubing, or hose. Outlet tube 36b is in communication with the upper portion of chamber 36 and is connected to inlet 32b of heat exchanger 32 by conduit 32f, which is usually a hose.

Chamber 36 is formed by outer cylinder 36c, inner cylinder 36d (which is located within the outer cylinder with its axis parallel to, but above the axis of cylinder 36c), inlet end plate 36e and outlet end plate 36f, all welded or brazed together to form a water tight chamber through which the engine coolant can circulate.

Heater inlet tube 36a is attached to inlet end plate 36e by screws 36g which extend through flange 36h and the end plate. Conduit 20b is attached to inlet tube 36a and communicates with an opening 36i in the lower surface of tube 36a. A wall 36j closes the end of tube 36a remote from end plate 36e.

The space 36k within inner cylinder 36d is a combustion chamber. Located between the ends of combustion chamber 36k is a baffle 36l fixed to the combustion chamber defining cylinder 36d in any appropriate manner.

A jacket 38 surrounds chamber 36. It has a cylindrical wall 38a spaced from cylinder 36c to provide a flue passage 38b and an end wall 38c spaced from end plate 36f to form a flue passage 38d. A flue pipe 40 communicates with passage 38b through opening 40a.

Passage 38d, passage 38b and flue 40 carry combustion products from combustion chamber 36k to the exterior of the automobile's engine compartment 12. These combustion products scrub the exterior surfaces of liquid chamber 36, transferring heat to the coolant. Fins 36m may be provided on chamber 36 to increase the heating surfaces, and consequently, the efficiency of the heater.

Combustion air is taken from fan 26 at any point where there is a positive pressure when the engine is operating. Air from fan 26 is picked up by funnel 42a and carried to the heater through duct 42, which is attached to end plate 36e as by welding around the periphery of a hole 42b in end plate 36e concentric with cylinder 36d.

The end of duct 42 attached to heater 34 is fixed to a venturi 42c having a throat 42d in the plane of end plate 36e and an enlarged inlet 42e communicating with the interior of duct 42. Thus, air flowing through duct 42 will travel at increased velocity and under reduced pressure through throat venturi 42d.

The air flowing through venturi 42c is utilized to effect a flow of fuel from carburetor 28 into combustion chamber 36k of booster heater 34. As shown in FIGURE 5, a small diameter tube 28d is connected from carburetor 28 to the inlet 44a of a normally closed solenoid valve 44 which is mounted on a bracket 44b attached to end plate 36e by screws 44d (see FIGURE 4) and which, when energized, opens, permitting fuel to flow between its inlet 44a and its outlet 44c. Tube 28d communicates with the interior of carburetor 28 at a point below the liquid level 28f in the carburetor float chamber 28e.

Attached to outlet 44c of valve 44 is one end of a small diameter tube 44h. Tube 44h is bent at 90°, one leg 44e of the tube lying on the centerline of duct 42 and the other tube leg 44f extending through the wall of duct 42 and communicating with the interior of valve 44. Leg 44e terminates in a nozzle having a small orifice 44g in the plane of throat 42d.

With the engine running, fan 26 blowing air through duct 42, and valve 44 open, the reduced pressure in throat 42d causes gasoline from carburetor 28 to flow through tube 28d, valve 44 and tube 44h and orifice 44g which breaks the gasoline into a spray and causes it to form a combustible mixture with the air passing through venturi 42c. This mixture is ignited and burns in booster heater combustion chamber 36k.

The engine ignition system is modified as shown in FIGURE 2 to provide a spark to ignite the gas-air mixture. The ignition system of engine 18, as is customary, includes a vehicle battery 46, one side of which is grounded. The other side of the battery is connected through breaker points 30a within distributor 30 to one terminal of the primary winding 48a of a spark coil 48. The other terminal of coil 48 is grounded, thus providing a primary circuit which intermittently energizes primary winding 48a as the breaker points close and open.

Breaker points 30a are opened and closed by a distributor cam 30c rotated by a shaft 30b which turns at half the engine speed.

The secondary (high voltage) winding 48b of spark coil 48 has a grounded terminal and a terminal connected to contact 30e at the center of distributor 30. Arranged in a circle around contact 30e are contacts 30f, one for each cylinder of engine 18. Each contact 30f is connected to an electrode 52a of one of the engine spark plugs (one of which is shown at 52). The other electrode 52b of each of the spark plugs is grounded.

A rotary distributor contact arm 30g, rotated by shaft 30b, successively connects contact 30e with each of contacts 30f. Breaker points 30a open during each period that arm 30g touches one of contacts 30f so that, as breaker points 30a open, a spark is produced at each of the plugs in succession. The conventional condenser 50 is connected across points 30a to increase the intensity of the ignition spark.

The ignition system thus far described is that ordinarily employed for four cycle, spark ignition engines and forms no part of the present invention. In order to provide ignition for the heater as well as for the engine, the conventional ignition system is modified as follows: a copper ring 30h is located within and concentric with the circle of contacts 30f. Ring 30h has fingers 30i projecting between each pair of contacts 30f so that, as arm 30g sweeps around, it alternately contacts one of contacts 30f and one of fingers 30i, distributing high voltage energy to, alternately, ring 30h and contacts 30f.

Ring 30h is insulated from contacts 30f and is connected by conductor 54 to electrode 56a of ignitor 56. Electrode 56a is insulated by sleeve 56b so that the spark jumps spark gap 56c from electrode 56a to venturi 42c which is grounded.

In the modified ignition system of the present invention, cam 30c is provided with twice as many lobes as usual; that is, a cam for an eight cylinder engine which would normally have 8 lobes is provided with 16 lobes so that points 30a will open at each contact of arm 30g with one of contacts 30f or with one of fingers 30i. Thus, for each revolution of shaft 30b (or each two revolutions of the engine crankshaft), there will be as many sparks at gap 56c as there are cylinders on the engine. This amounts to a practically continuous discharge across spark gap 56c as long as the engine is running.

In view of the foregoing booster heater ignition system and combustion air supply system, it will be apparent that, when engine 18 is running, combustion air will be continuously supplied to the heater and a spark will be continuously present in the combustion chamber, so that the operation of the heater can be controlled by opening and closing valve 44 to control the flow of fuel to the heater.

Solenoid valve 44 is controlled by a system including a thermostat 58 of any suitable construction located within inlet tube 36a. A particularly suitable thermostat is the cartridge type which, in the form shown in FIGURE 5, has a metallic casing 58a, a thermally expansible plastic filler 58b, and a metal plunger 58c. Casing 58a surrounds plastic filler 58b on all sides and has a hole in one end through which plunger 58c projects. As thermostat 58 is heated, plastic filler 58b expands and forces plunger 58c from casing 58a. Thermostats of this type are commercially available; and, since the thermostat design forms no part of the present invention, it is not deemed necessary to describe it further.

Casing 58a is provided with a flange 58d which is attached (as by soldering) to end wall 36j of inlet tube 36a so that thermostat 58 projects into and is sensitive to the temperature of the water in inlet tube 36a. Plunger 58c projects outside of heater 34 at the inlet end thereof.

Thermostat 58 completes or interrupts the continuity of the fuel valve solenoid actuating circuit shown in FIGURE 3 as the coolant temperature falls below or rises above a predetermined temperature. Referring now to this figure, the ungrounded side of vehicle battery 46 is connected in series through a normally closed switch 60, the winding of solenoid valve 44, and manual switch 62 (located on the control panel of the car) to ground. When switches 60 and 62 are closed, the winding of valve 44 is energized, opening the valve member (not shown) and permitting fuel to flow through tube 28d, valve 44, and tube 44h to booster heater 34. By opening switch 62, the operator can manually interrupt the above-described circuit to close valve 44 and prevent operation of the booster heater in warm weather.

Switch 60 is automatically opened and closed by thermostat 58. This switch includes a fixed blade 60a and a movable spring blade 60b and has normally closed contacts 60c. When the water in booster heater inlet tube 36a reaches a predetermined high temperature (normally 160° F.) the expansion of the plastic in thermostat 58 moves plunger 58c from its cold position shown in FIGURE 5 to its hot position shown in FIGURE 5A and open contacts 60c, breaking the valve operating circuit described above and causing valve 44 to close and stop operation of booster heater 34 by terminating the flow of fuel to the heater.

In order to produce rapid engine warm-up, a second thermostat 64, similar to thermostat 58, is located within chamber 36 to control the flow of engine coolant. As shown in FIGURES 5 and 5A, a ring 64a attached as by soldering to the outer shell 64b of thermostat 64 forms a valve, which closes and opens an opening 64c between booster heater coolant inlet tube 36a and the chamber 36 in which the coolant is heated. A small hole 64d allows water to flow at a slow rate from inlet tube 36a to chamber 36 when the valve is closed so that thermostat 64 will be continuously bathed by and remain sensitive to the temperature of the liquid circulating through engine 18.

A compression spring 64e biases the valve 64a to the closed position. Valve 64a is opened by the extension of thermostat plunger 64f from thermostat body 64b. Plunger 64f projects into booster heater inlet tube 36a and is attached at its outer or exposed end 64g to a bracket 64h fixed in tube 36a in any appropriate manner.

When thermostat 64 is heated to a predetermined temperature, plunger 64f is forced out of casing 64b by the expansion of the heat responsive material in the casing. Since plunger 64f cannot move, thermostat body 64b is moved to the left to the position shown in FIGURE 5A, compressing spring 64e and opening valve 64a. With the engine running and valve 64a open, water pump 24 forces the coolant from inlet tube 36a into chamber 36 as indicated by arrows 64i. Thermostat 64 is designed to start to open at about 110° F. so that cold water will not circulate through booster heater 34 except for the small amount passing through hole 64d. As the water in chamber 36 is warmed, valve 64a will gradually open, increasing the flow rate through the water heater.

The above-described thermostatic coolant flow control is an important feature of the present invention since it brings about substantially more rapid heating of the coolant than if unrestricted flow of the cold coolant through the booster heater were permitted.

With the coolant in booster heater 34 cold, switch 62 closed, and engine 18 running, heater 34 is supplied with air from fan 26 and fuel from carburetor 28 and the modified ignition system described above produces a spark across spark gap 56c. Combustion therefore occurs in combustion chamber 36k, heating the coolant in liquid chamber 36. As soon as the coolant surrounding it is warm, thermostat 64 will move gradually toward the position shown in FIGURE 5A, and coolant will flow from pump 24 through jacket 20a, conduit 20b, tube 36a, chamber 36, tube 36b, conduit 32f, heater core 32a, tube 32c and hose 32e back to pump 24, heating heat exchanger 32.

When the temperature of the coolant entering inlet tube 36a from jacket 20a rises above the temperature at which thermostat 58 opens switch 60 (as shown in FIGURE 5A), the fuel valve operating circuit shown in FIGURE 3 is interrupted closing fuel valve 44 and stopping the flow of fuel to heater 34. This terminates combustion in chamber 36k, although the spark and combustion air supply will be continued. Fuel will flow and combustion will be resumed whenever the temperature of the coolant entering tube 36a drops, allowing the contacts of switch 60 to close.

*Second embodiment*

If control of the fuel from a switch on the instrument panel is not desired, fuel flow controlling thermostat 58 may be employed to operate a mechanical valve, and the control circuit and parts shown in FIGURE 3 may be eliminated. In this case, an additional manual valve may be provided in fuel supply tube 28d so that the operator can discontinue use of the booster heater when desired. This manual valve can be designed to be operated from a knob on the instrument panel or in any other convenient manner.

Referring now to the drawing, the modification of my invention shown in FIGURES 6 and 6A includes a mechanical fuel flow control valve 144 operated by a thermostat 158 which functions in substantially the same manner as and may be of the same type as the thermostat 58 described above. Housing 144a of valve 144 has flanges 144b attached in any suitable manner to a flange 136 on booster heater coolant inlet tube 36a. A gasket (not shown) may be used between the mating surfaces of flanges 136 and 144b to prevent leakage.

In this embodiment, fuel supply tube 28d extends into the bottom of valve housing 144a and terminates in a valve seat 128. A second fuel supply tube 44h, attached to the top of valve housing 144a, communicates with the interior of the valve housing. Tube 44d is identical to the tube 44h described above in conjunction with the first embodiment of my invention.

Valve 144 has a valve stem 146 attached to an arm 146a which is pivoted on bracket 146b by a pin 146c. Bracket 146b is attached in any convenient manner to valve housing 144a.

Thermostat 158 is substantially identical to the thermostat 58 shown in FIGURE 5 except that a groove 158b is formed near the outer end of its plunger 158a. One end of a flat spring link 146d is attached to arm 146a and the other end is slotted and straddles groove 158b. When thermostat 158 is heated, plunger 158a is forced out of the thermostat body, causing spring link 146d to rotate arm 146a clockwise about pin 146c, pressing valve stem 146 onto seat 128. Continued movement of plunger 158a flexes spring 146d to the stressed configuration shown in FIGURE 6A.

When thermostat 158 cools, thermostat plunger 158a retracts, restoring spring link 146d to the position shown in FIGURE 6. This allows spring 146d to pivot arm 146a counterclockwise about pin 146c and lift stem 146 off its seat. Upward movement of arm 146a is limited by stop pin 144d.

A U-shaped spring 146e is compressed between a notch in the end of arm 146a and a notch 144e inside the end wall 144c of housing 144a. The spring forms a toggle with arm 146a so that the valve snaps from the fully open to the fully closed position and from the fully closed to the fully open positions.

Third embodiment

When the booster heater of the present invention is to be added as an accessory, it may not be practical to modify distributor 30 as explained in connection with FIGURE 2. In this case heater ignition may be provided by the installation of the separate spark coil booster heater ignition system shown in FIGURE 7. The primary circuit of spark coil 204 extends from the ungrounded side of battery 46, through engine ignition switch 202, vibrator spring blade 204a, vibrator breaker points 204b, and primary winding 204c of spark coil 204 to ground. The usual condenser 206 may be connected across breaker points 204b.

The spark coil secondary circuit extends from ground through secondary winding 204d of spark coil 204, electrode 56a, and across spark gap 56c to ground.

When ignition switch 202 is closed, current flows in the primary circuit through coil 204c, causing magnetic core 204e of spark coil 204 to attract armature 204f, opening breaker points 204b and breaking the primary circuit. Since armature 204f is no longer attracted toward the coil when the breaker points open, spring blade 204a will then reclose points 204b. Repeated make and break of the contacts at points 204b will produce intermittent high voltage spark discharges across spark gap 56c to provide substantially continuous ignition for the heater as long as engine ignition switch 202 is closed. Spark coils of this type are well known, and the coil and the ignition circuit in which it is incorporated by themselves form no part of the present invention and are not seen to require further elaboration.

Fourth embodiment

In the following embodiment, components which are identical to those previously described have the same reference numerals. In the form of the invention shown in FIGURES 8, 9 and 9A, booster heater 300 heats the water or other engine coolant flowing to heat exchanger 32. Heater 300 is supplied with combustion air from fan 26 through duct 42. Fuel is supplied to heater 300 from carburetor 28 through fuel supply tube 28d and mixed with the combustion air. The fuel-air mixture is ignited by a spark plug 56 connected to distributor 30 by a conductor 54, as is shown in FIGURE 2. Fuel flow is controlled by a valve 144 constructed as shown in FIGURES 6 and 6A.

As shown in FIGURE 9, heater 300 includes a coolant heating chamber 302 formed by an inner cylinder 302a, an outer cylinder 302b, an inlet end plate 302c and an outlet end plate 302d, all welded or brazed together into a unitary structure. An outlet tube 302e communicates with chamber 302 through the upper side of cylinder 302b near outlet end plate 302d, and an inlet tube 302f communicates with chamber 302 through the lower side of cylinder 302b near inlet end plate 302c. The cylindrical space in inner cylinder 302a provides a combustion chamber 302g.

A jacket 306 having a cylindrical wall 306a surrounds chamber 302 and is spaced from outer cylinder 302b to provide an annular flue passage 306e around cylinder 302b. End wall 306c of jacket 306 is spaced from outlet end plate 302d to provide a flue passage 306d connecting combustion chamber 302g with flue passage 306e. A flue pipe 40 is attached to the lower side of wall 306a. Flue pipe 40 may be of any length and configuration suitable for carrying combustion products to the outside of the vehicle.

Suitable conduits are provided to interconnect booster heater coolant heating chamber 302 heat exchanger 32 and the coolant jacket 20a of engine block 20. The inlet 32b of heat exchanger 32 is connected by hose 32d to outlet tube 302e of booster heater 300 and outlet 32c of the heat exchanger is connected by hose 32e to a T fitting 32j. A hose 32g connects T fitting 32f to the inlet of pump 24 and a hose 32h connects the T fitting to inlet 304a of a thermostatically actuated coolant flow controlling valve 304. A hose 32i connects the outlet from jacket 20a at the upper part of block 20 to tube 304b of valve 304.

Valve 304 is a three-way valve as shown in FIGURES 9 and 9A, and has two inlets, 304a and 304b, and a single outlet 304f. One of the inlets is opened when the other is closed by reciprocal movement of a valve disc 304c in valve 304. With inlet 304a open and 30b closed as shown in FIGURE 9, the system filled with coolant, and combustion in chamber 302g, circulation by thermosiphonic action takes place in a circuit formed by booster hater coolant heating chamber 302, outlet tube 312e, hose 32f, heat exchanger 32, hose 32e, T fitting 32j, hose 32h, valve 304, and tube 302f.

With inlet 304a of valve 304 closed as shown in FIGURE 9A, and with valve inlet 304b open and engine 18 running, pump 24 will force coolant through jacket 20a, hose 32i, inlet 304b, valve 304, tube 302f, chamber 302, tube 302e, hose 32d, heat exchanger 32, hose 32e, T fitting 32j and hose 32g back to pump 24.

Flow through inlets 304a and 304b is controlled by valve disc 304c which moves between a position against seat 304e at the end of valve inlet 304a (as shown in FIGURE 9) and a position against seat 304g at the end of valve inlet 304b (as shown in FIGURE 9A).

Valve disc 304c is moved between its two seated positions by a single thermostat 308. Thermostat 308 is similar to thermostat 58 but has two plungers one protruding from each end of the thermostat body. Plunger 308a moves valve disc 304c and plunger 308b actuates fuel valve 144 by moving spring 146d in the manner shown in FIGURES 6 and 6A and described above in conjunction with the second embodiment of my invention. Valve disc 304c has a central hole fitting over plunger 308a and is positioned on the plunger by two override springs 308c and 308d one on each side of the disc. When the disc is seated further movement of the plunger will compress one of the springs without moving the valve disc.

When thermostat 308 is cold, both plungers are retracted as shown in FIGURE 9. With the plungers retracted, valve 144 permits fuel to flow to the booster heater, where it is burned to heat the engine coolant. Valve 304 prevents pump 24 from circulating cold engine coolant through heater 32, but permits thermosiphonic circulation between booster heater 300 and heat exchanger 32 to quickly heat the latter.

When thermostat 308 is heated to a predetermined temperature, both plungers are extended as shown in FIGURE 9A. Fuel flow to the booster heater is cut off, and valve inlet 304b is opened, permitting pump 24 to circulate warm coolant from engine jacket 20a through booster heater 300 and heat exchanger 32 solely by waste heat from engine 18.

Thus, when the coolant is cold, combustion is initiated in booster heater 300, and the coolant is circulated directly between the booster heater and heat exchanger 32 to rapidly bring the latter to operating temperature. But, when the engine is at normal operating temperature and giving off sufficient heat to warm the air blown over heat exchanger 32, the booster heater is shut off and pump 24 circulates the engine coolant from the engine 18 to heat exchanger 32 so that the coolant is heated only by heat extracted from the engine.

To permit a small flow of coolant over thermostat 308 at all times and insure its proper operation, a small hole 304h is provided in valve disc 304c in the manner discussed above in conjunction with the first embodiment of my invention.

*Fifth embodiment*

In this form of my invention illustrated in FIGURES 10–12, the booster heater 400 has a liquid chamber 402 similar to that shown in FIGURE 9 and is equipped with the same means of providing fuel, air and ignition as the embodiment shown in FIGURES 1 to 5. However, electric fuel valve 44 is not attached to the heater, but is located close to the carburetor, and switch 60 is mounted on a control valve 404 adjacent heat exchanger 32.

Control valve 404 is a thermostatic valve having a valve body 404a, a valve inlet 404b and two valve outlets, 404c above and 404d below the valve inlet. Valve 404 has a cylindrical bore 404e within which a piston 404f is reciprocated by movement of the plunger 406a of a thermostatic element 406. Thermostat 406 is preferably identical to the thermostat 308 shown in FIGURE 9 except that a piston 404f is threaded onto the plunger 406a as shown in FIGURE 12, and plunger 406b is arranged to open the contacts of switch 60 at a predetermined temperature.

Valve inlet 404b is smaller in diameter than valve bore 404e and is connected to bore 404e at 404g. Piston 404f is the same length as the diameter of valve inlet 404b at 404g so that, unless the piston is exactly in line with inlet 404b at 404g there will be an opening past piston 404f to outlet 404d above the piston or to outlet 404c below the piston, but never to both at the same time. The position of piston 404f can be adusted by rotating it on threads 406c so that it will reverse the direction of water flow at any desired temperature of thermostatic element 406.

Booster heater chamber 402 has an inlet tube 402a on its lower side and an outlet tube 402b on its upper side. Inlet tube 402a communicates with a T fitting 402c so that coolant can enter chamber 402 through either of the two fittings, 402d and 402e fixed to and communicating with the T fitting. Fitting 402d is connected by hose 408 to outlet 404c of valve 404, and fitting 402e is connected by hose 410 to jacket 20a of block 20.

Outlet tube 402b is connected by hose 412 to the upper connection 32b of heat exchanger 32. Lower connection 32c of heat exchanger 32 is connected to inlet 404b of valve 404 by hose 414. Outlet 404d of valve 404 is connected to the inlet of pump 24 of hose 414a.

Since thermostatic element 406 senses the temperature of the coolant leaving heat exchanger 32, the flow path will depend on the coolant temperature. When the coolant is cold, both plungers will be retracted, piston 404f will be above inlet 404b, and coolant will flow by thermosiphonic action through outlet 404c, hose 408, T fitting 402c, booster heater coolant heating chamber 402, hose 412, heat exchanger 32, hose 414 and valve inlet 404b back to outlet 404c of valve 404. Since plunger 406b will also be retracted, contacts 60 will be closed, the solenoid of fuel valve 44 will be energized, and the valve will open, permitting fuel to flow through heater 400 where it is burned to heat the coolant.

When the temperature of the coolant leaving heat exchanger 32 reaches a predetermined maximum, both plungers will be extended, thermosiphonic flow through hose 408 will be stopped, and pump 24 will circulate coolant through jacket 20a, hose 410, fitting 402e T fitting 402c, booster heater chamber 402, hose 412, heat exchanger 32, hose 414, valve inlet 404b, valve outlet 404d and hose 414 back to pump 24. Heat exchanger 32 will thus be supplied with warm coolant from the engine jacket. In this case, plunger 406b will be extended and switch 60 will be opened so that valve 44 will be deenergized and fuel flow to the heater will be cut off.

The invention may be embodied in other specific forms without departing from the spirit or essential characteristics thereof. The present embodiments are therefore to be considered in all respects as illustrative and not restrictive with the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a vehicle heating system of the closed, circulating liquid type including a combustion type booster heater, a spark ignition engine, and an ignition system comprising a distributor for said engine, the improvement comprising: a spark type ignitor in said booster heater; means comprising make and break contact means for generating high voltage electrical pulses and alternately distributing said pulses to said ignitor whereby said means supplies a rapid succession of ignition sparks to said booster heater to thereby provide a substantially continuous ignition at said heater, and to successive one of said spark plugs of said engine, said means being incorporated in said distributor.

2. The vehicle heating system as defined in claim 1, wherein the pulse distributing means comprises:
   (a) a distributor shaft rotatable at a velocity proportional to the engine speed; and
   (b) contact means operated by the rotation of said shaft to alternately connect the pulse generating means to an engine spark plug and to the igniter of the booster heater.

3. In a vehicle heating system of the closed, circulating liquid type including a combustion type booster heater including a combustion chamber for raising the temperature of said liquid and a vehicle engine having a power source and ignition means including spark plugs, the improvements of:
   (a) means for effecting a continuous supply of combustion air to the combustion chamber of said heater when the vehicle engine is running comprising a combustion air supply duct communicating with said chamber and means driven by said engine for forcing combustion air through said supply duct to said combustion chamber;
   (b) a spark plug in said combustion chamber for igniting fuel supplied thereto;
   (c) means connected to said vehicle ignition means for alternately distributing high voltage electrical pulses to said vehicle engine spark plugs and said booster heater spark plug to provide substantially continuous ignition in said combustion chamber; and
   (d) means for supplying fuel to said heater only when the temperature of said circulating liquid is below a predetermined temperature.

4. The vehicle heating system as defined in claim 3, wherein the fuel supply means includes a control system comprising:
   (a) a single temperature sensing element; and
   (b) a fuel flow control valve mechanically actuated by said sensing element.

5. The vehicle heating system as defined in claim 3, wherein the fuel supply means includes a control system comprising:
   (a) a single temperature sensing element; and
   (b) a fuel flow control valve electrically actuated by said sensing element.

6. In a vehicle heating system of the closed, circulating liquid type including a combustion type liquid booster heater, a heat exchanger adapted to have air circulated thereover to heat said air, an engine having coolant passages adapted to have liquid circulated therethrough to cool said engine and heat said liquid, conduit means interconnecting said booster heater, said heat exchanger, and said coolant passages and a single pump for circulating said liquid through said liquid conduit means and said coolant passages, the improvement of:

(a) means including a three-way valve having a single valve disc actuator for effecting thermosiphonic circulation of the circulating liquid solely between said heat exchanger and said booster heater when said circulating liquid is below a predetermined temperature; and (b) means including said pump for circulating said liquid through said heat exchanger and said coolant passages if said liquid is above said predetermined temperature.

7. The vehicle heating system as defined in claim 6, including means for supplying fuel to said booster heater only when said liquid is below said predetermined temperature.

8. A closed, circulating liquid type heating system for a vehicle having a liquid-cooled engine including fuel supply means, a coolant jacket, and a coolant pump for circulating coolant through said jacket to absorb heat from said engine, comprising:

(a) a heat exchanger for transferring to the passenger compartment of the vehicle heat extracted from coolant circulated through said heat exchanger;

(b) a booster heater for supplying additional heat to said coolant by the combustion of fuel in said heater;

(c) thermostatically controlled three-way valve means including a thermostatic element responsive to the temperature of the circulating coolant, a valve inlet, first and second valve outlets, and a movable valve member actuated by said thermostatic element, said thermostatic element positioning said valve member to connect said valve inlet with said first valve outlet when said coolant is below a predetermined temperature and positioning said valve member to connect said valve inlet with said second valve outlet when said coolant is above said predetermined temperature;

(d) a coolant duct connecting said jacket with said booster heater;

(e) a coolant duct connecting said booster heater with said heat exchanger;

(f) a coolant duct connecting said heat exchanger with said valve inlet;

(g) a coolant duct connecting said first valve outlet with said booster heater;

(h) a coolant duct connecting said second valve outlet to the inlet of said pump; and (i) means for supplying fuel to said heater when said coolant is below said predetermined temperature and for discontinuing the flow of fuel to said heater when said coolant is above said predetermined temperature.

9. In combination, a closed, circulating liquid type vehicle heating system having an engine, and an engine ignition system comprising a battery, a spark coil, a distributor and engine spark plugs, said spark coil having a primary winding and a secondary winding, said primary winding being in series with said battery, and said distributor being connected to said secondary winding and to said spark plugs to distribute high voltage energy from said secondary winding successively to each of said engine spark plugs, said heating system comprising:

(a) a booster heater for raising the temperature of the circulating liquid, including a combustion chamber;

(b) a spark plug in said combustion chamber for igniting fuel supplied thereto; and (c) means for distributing high voltage electrical pulses to said booster heater spark plug, comprising:
 (1) a distributor shaft adapted to rotate at a speed proportional to the speed of said engine,
 (2) breaker means operated by the rotation of said shaft to make and break the circuit to the primary winding of said spark coil; and
 (3) contact means operated by the rotation of said shaft for connecting said secondary winding alternately to successive ones of the spark plugs of said engine and to said heater spark plug, said secondary winding being connected to each of the spark plugs of said engine once during each revolution of said shaft.

10. In a vehicle heating system of the closed, circulating liquid type including a combustion type booster heater having a first conduit means forming a circulating liquid inlet and a circulating liquid outlet for providing liquid flow past said heater to raise the temperature of the circulating liquid and a vehicle engine, the improvement of a system for automatically controlling the operation of the booster heater consisting solely of:

(a) combustion air and ignition means operable when the engine is running; and (b) first valve means disposed in said inlet for controlling the flow of said circulating liquid;

(c) a source of fuel for said heater;

(d) second conduit means communicating with said fuel source adapted to supply fuel to said heater;

(e) second valve means disposed in said second conduit means for controlling the fuel flow to said heater disposed adjacent said first valve means;

(f) single means for sensing the temperature of circulating liquid in said inlet formed by said first conduit means, said single means having two oppositely facing ends, one of said ends facing said first valve means and the other of said ends facing said second valve means;

(g) means extending said first valve means facing end responsive solely to said temperature sensing means for controlling the flow of the circulating liquid through said first valve means; and (h) means extending from said second valve means facing end responsive solely to said temperature sensing means for controlling the flow of fuel through said second valve means to said heater.

References Cited by the Examiner

UNITED STATES PATENTS

| | | | |
|---|---|---|---|
| 1,357,598 | 11/1920 | Thompson | 126—110 X |
| 1,975,033 | 9/1934 | Wolff | 158—76 |
| 2,072,763 | 3/1937 | Mayo | 237—8 |
| 2,384,468 | 9/1945 | Holthouse | 158—28 |
| 2,459,575 | 1/1949 | Neumann et al. | 158—28 |
| 2,492,777 | 12/1949 | Wirth et al. | 158—28 X |
| 2,585,477 | 2/1952 | Leslie et al. | 158—42.4 |
| 2,904,417 | 9/1959 | TeNuyl | 158—1.5 X |
| 3,072,176 | 1/1963 | Sunday | 237—12.3 X |
| 3,092,325 | 6/1963 | Brown et al. | 237—12.3 |

FOREIGN PATENTS

| | | |
|---|---|---|
| 767,631 | 5/1934 | France. |
| 295,278 | 3/1954 | Switzerland. |

WILLIAM F. O'DEA, *Acting Primary Examiner.*

EDWARD J. MICHAEL, *Examiner.*